(12) United States Patent
Endo et al.

(10) Patent No.: US 6,306,496 B1
(45) Date of Patent: Oct. 23, 2001

(54) BIAXIALLY ORIENTED POLYESTER FILM

(75) Inventors: Kouhei Endo; Hiroshi Tokuda, both of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/367,075

(22) PCT Filed: Dec. 10, 1998

(86) PCT No.: PCT/JP98/05584

§ 371 Date: Aug. 9, 1999

§ 102(e) Date: Aug. 9, 1999

(87) PCT Pub. No.: WO99/29489

PCT Pub. Date: Jun. 17, 1999

(30) Foreign Application Priority Data

Dec. 11, 1997 (JP) .................................... 9-341232

(51) Int. Cl.[7] .......................... B32B 27/36; B29C 55/00; B29C 55/12; B29C 55/14
(52) U.S. Cl. ......................... 428/339; 428/332; 428/480; 428/910; 264/288.4; 264/290.2; 528/308; 528/308.1; 528/308.6
(58) Field of Search .................... 428/480, 332; 264/290.2, 288.4; 528/308, 308.1, 308.6

(56) References Cited

U.S. PATENT DOCUMENTS 5,843,578 * 12/1998 Sasaki et al. ................. 428/483

FOREIGN PATENT DOCUMENTS

| 56-18381 | 4/1981 | (JP) . |
|---|---|---|
| 57-57629 | 4/1982 | (JP) . |
| 57-30854 | 7/1982 | (JP) . |
| 58-24418 | 2/1983 | (JP) . |
| 6-297562 | 10/1994 | (JP) . |
| 7-314552 | 12/1995 | (JP) . |
| 8-224777 | 9/1996 | (JP) . |
| 9-57845 | 3/1997 | (JP) . |
| 10-128845 | 5/1998 | (JP) . |
| 10-138333 | 5/1998 | (JP) . |

* cited by examiner

*Primary Examiner*—Vivian Chen
(74) *Attorney, Agent, or Firm*—Sughrue, Moin, Zinn, Macpeak & Seas, PLLC

(57) ABSTRACT

A biaxially oriented polyester film which has good thickness nonuniformity in both longitudinal and transverse directions, uniform physical properties in a transverse direction and high strength in a longitudinal direction. This film has such characteristic properties that (a) an F-5 value in a longitudinal direction of 13 kg/mm² or more, (b) a thickness nonuniformity in each of both longitudinal and transverse directions of 8% or less, and (c) a difference in the heat shrinkage factor of 0.02 to 0.2% per 1 m in a transverse direction, said heat shrinkage factor being measured at 105° C. in the longitudinal direction.

8 Claims, No Drawings

BIAXIALLY ORIENTED POLYESTER FILM

FIELD OF THE THE TECHNOLOGY

The present invention relates to a biaxially oriented olyester film. More specifically, it relates to a biaxially oriented polyester film which has good thickness nonuniformity in both longitudinal and transverse directions, uniform physical properties in a transverse direction and high strength in a longitudinal direction.

RELATED ART

A biaxially oriented polyester film having high strength in a longitudinal direction is generally a film having a large heat shrinkage factor in a longitudinal direction because it is stretched in a longitudinal direction at a high stretch ratio. Therefore, compared with a balanced (balanced type) film whose strengths in biaxial directions are nearly balanced and a transversely tensilyzed film whose strength in a transverse direction is made higher than strength in a longitudinal direction, the above film has larger shrinkage in a longitudinal direction in a transverse stretching zone and a heat-setting zone, and there is apt to occur such a phenomenon that the lengths in a longitudinal direction at a center portion and an edge portion in a transverse direction (width direction) differ from each other (this phenomenon may be referred to as "bowing" hereinafter). Owing to this bowing, the physical properties in a transverse direction of the film become nonuniform and there are caused large differences in heat shrinkage factor and mechanical properties between the center portion and the edge portion in a transverse direction, thereby bringing various troubles.

For example, in a magnetic recording medium, such troubles occur that a difference in skew caused by the contact with a magnetic head or by heat shrinkage factor due to differences in the physical properties of a film according to the location of a base film in a transverse direction of an entire film, or that the running of a film is curved by differences in the extension and contraction in a width direction of the film when a magnetic coating is introduced into a drying step after the coating has been made, thereby influencing productivity.

For obtaining uniform physical properties in a transverse direction of the film, the suppression of bowing is effective. As means of suppressing bowing, JP-A 57-57629 and JP-A 58-24418 propose a method for finely stretching a film in a heat-setting zone. However, this proposal is aimed to equalize the physical properties of a film in both longitudinal and transverse directions, and the stretch ratios in longitudinal and transverse directions are therefore made almost equal to each other. However, the proposal does not contain no mention of the equalization of physical properties in-a transverse direction in an area where the stretch ratio in a longitudinal direction is made 4.0 times or more as in a film of a type having increased strength in a longitudinal direction.

JP-A 9-57845 proposes a method of finely stretching a film in a transverse direction many times, but does not make any mention of stretching conditions for having a high stretch ratio in a longitudinal direction of 4.0 times or more.

DISCLOSURE OF THE INVENTION

It is an object of the present invention to provide a biaxially oriented polyester film which has good thickness nonuniformity in both longitudinal and transverse directions, uniform physical properties in a transverse direction and high strength in a longitudinal direction.

It is another object of the present invention to provide a process for producing the above biaxially oriented polyester film of the present invention.

Other objects and advantages of the present invention will become apparent from the following description.

According to the present invention, firstly, the above objects and advantages of the present invention are attained by a biaxially oriented polyester film which has (a) an F-5 value in a longitudinal direction of 13 kg/mm$^2$ or more, (b) a thickness nonuniformity in each of both longitudinal and transverse directions of 8% or less, and (c) a difference in a transverse direction of heat shrinkage factor at 105° C. in a longitudinal direction of 0.02 to 0.2% per 1 m in a transverse direction.

Secondly, the above objects and advantages of the present invention are attained by a process for producing a biaxially oriented polyester film comprising the steps of:

stretching a substantially amorphous unstretched polyester film to 4.0 to 6.0 times in a longitudinal direction;

stretching the so-obtained film to 3.0 times or more but less than 4.0 times in a transverse direction;

stretching the so-obtained film to 1.01 to 1.20 times in a transverse direction while heat-setting it; and relaxing the so-obtained film by 0 to 20% in a transverse direction while cooling it.

DETAILED DESCRIPTION OF THE INVENTION

The biaxially oriented polyester film of the present invention is a longitudinally tensilyzed film having high strength in a longitudinal direction and a uniform distribution of physical properties in a transverse direction.

The above biaxially oriented polyester film has an F-5 value in a longitudinal direction of 13 kg/mm$^2$ or more, preferably 13 to 18 kg/mm$^2$, more preferably 13.5 to 16.0 kg/mm$^2$. This F-5 value can be provided by controlling the stretch ratio in a longitudinal direction of the film to 4.0 times or more, more specifically 4.3 times or more. To this end, stretching may be carried out in a single-stage longitudinal stretching or in a multi-stage longitudinal stretching with two or more stages.

In the biaxially oriented polyester film of the present invention, each of a thickness nonuniformity in a longitudinal direction and that in a transverse direction is 8% or less. When the thickness uniformity is more than 8%, the uniformity of the film cannot be accepted, which is disadvantageous.

The biaxially oriented polyester film of the present invention preferably has a thickness of 3 μm or more. The above thickness nonuniformity preferably has the following relationship with film thickness.

When the thickness of a film is 3 to 14 μm, the thickness nonuniformity satisfies the following expression:

$$-0.2t+3.5 \leq d \leq -0.4t+9.2$$

wherein t is the thickness of the film (μm) and d is a thickness nonuniformity (%).

When the thickness of a film is more than 14 μm, the thickness nonuniformity (d) is 0.7 to 3.6%.

Further, in the biaxially oriented polyester film of the present invention, a difference in a transverse direction of heat shrinkage factor at 105° C. in a longitudinal direction is 0.02 to 0.2% per 1 m in a transverse direction.

The heat shrinkage factor in a longitudinal direction is preferably 3% or less, more preferably 1.5% or less at any location.

Further, in the above biaxially oriented polyester film, difference in a transverse direction of elongation at 1000° C. under a load of 1.000 g/mm$^2$ in a longitudinal direction (to be referred to as "TMA elongation" hereinafter) is preferably 0.01 to 0.1% per 1 m in a transverse direction.

The polyester to which the present invention is directed is a linear polyester comprising a dicarboxylic acid component and a glycol component.

Illustrative examples of the dicarboxylic acid component include aromatic dicarboxylic acids such as terephthalic acid, isophthalic acid, phthalic acid, naphthalenedicarboxylic acid, diphenyldicarboxylic acid and diphenyl ether dicarboxylic acid. Out of these, terephthalic acid and 2,6-naphthalenedicarboxylic acid are preferred. Illustrative examples of the glycol component include ethylene glycol, propylene glycol, 1,4-butanediol, 1,5-pentanediol, 1,6-hexanediol, 1,4-cyclohexane dimethanol, diethylene glycol, neopentyl glycol and the like. Out of these, ethylene glycol and 1,4-butanediol are preferred, and ethylene glycol is particularly preferred.

Out of polyesters, polyethylene terephthalate, polyethylene-2,6-naphthalene dicarboxylate and polybutylene terephthalate are preferred, and polyethylene terephthalate and polyethylene-2,6-naphthalene dicarboxylate are particularly preferred because they are excellent in mechanical properties and thermal properties.

The polyethylene terephthalate, polyethylene-2,6-naphthalene dicarboxylate or polybutylene terephthalate may be a polyester comprising, for example, 10 mol % or less of a dicarboxylic acid component or a glycol component as a copolymer component, or a polyester comprising, as a copolymer component, a polyvalent compound having at least 3 functional groups in such a small amount (for example, 5 mol % or less) that the polyester is substantially linear.

Preferred examples of the above components to be copolymerized for polyethylene terephthalate Include isophthalic acid, 2,6-naphthalenedicarboxylic acid, 4,4'-diphenyldicarboxylic acid and the like as an acid component and propylene glycol, 1,4-cyclohexane dimethanol, diethylene glycol, neopentyl glycol and the like as a glycol component.

Preferred examples of the components to be copolymerized for polyethylene-2,6-naphthalene dicarboxylate include terephthalic acid, isophthalic acid, 4,4'-diphenyldicarboxylic acid and the like as an acid component and 1,4-butanedlol, 1,6-hexanediol, propylene glycol, 1,5-pentanediol, 1,4-cyclohexane dimethanol, diethylene glycol, neopentyl glycol and the like as a glycol component.

Preferred examples of the components to be copolymerized for polybutylene terephthalate include isophthalic acid, 2,6-naphthalenedicarboxylic acid, 4,4'-diphenyldicarboxylic acid and the like as an acid component and ethylene glycol, 1,6-hexanediol, propylene glycol, 1,5-pentanediol, 1,4-cyclohexane dimethanol, diethylene glycol, neopentyl glycol and the like as a glycol component.

In addition to the above components, dicarboxylic acid components such as hexahydroterephthalic acid, adipic acid, sebacic acid and dodecanedicarboxylic acid, and glycol components such as 1,3-propanediol, polyethylene glycol, polytetramethylene glycol, dlpropylene glycol, triethylene glycol and addition product of bisphenol A with alkylene oxide can be mentioned as preferred examples of the components to be copolymerized for polyethylene terephthalate, polyethylene-2,6-naphthalene dicarboxylate and polybutylene terephthalate. The above polyesters may be a homopolymer, copolymer or blend thereof.

The polyester preferably has a volume resistivity in a molten state at a temperature 15° C. higher than its melting point (Tm) of $0.5 \times 10^9$ Ω·cm or less under the measurement condition of 50 Hz AC voltage. The polyester having the above volume resistivity can be obtained by, for example, blending it with a compound having an alkali metal salt or copolymerizing it with a slight amount of quaternary phosphonium sulfonate, whereby good close contact of a film with a cooling drum can be obtained.

To improve the winding property of a polyester film and impart surface properties required for each application purpose to a polyester, organic or inorganic fine particles having an average particle diameter of 0.001 to 5.0 μm are preferably contained in an amount of 0.01 to 2.0 wt % based on the polyester. Illustrative examples of the fine particles include inorganic fine particles such as dry silica, wet silica, zeolite, calcium carbonate, calcium phosphate, we kaolin, kaolinite, clay, talc, titanium oxide, alumina, zirconia, aluminum hydroxide, calcium oxide, graphite, carbon black, zinc oxide, silicon carbide, silver oxide or the like, and organic particles such as crosslinked acrylic resin particles, crosslinked polystyrene resin-particles, melamine resin particles, crosslinked silicone resin particles or the like.

A lubricant, antioxidant, antistatic agent, colorant, pigment, fluorescent brightener, plasticizer, ultraviolet absorber and other resin may be added as required.

In the production of the biaxially oriented polyester film of the present invention, a molten polyester is first extruded onto a rotary cooling drum and brought into close contact with the rotary cooling drum to be cooled to give a substantially amorphous unstretched film. At this time, static charge is preferably applied to the air side (opposite to the cooling drum) of the film surface in a non-contact manner, in the vicinity of a location where the extruded molten film reaches the rotary cooling drum. For example, the polyester is supplied to an extruder and molten at a temperature of from the melting point of the polymer to 350° C., the molten polymer is extruded from a die, and solidified by cooling static charge is applied to the extruded film to allow the film to come into close contact with the cooling drum to be cooled to hardening, whereby an unstretched film is produced. At this process, the raw material of the polyester preferably is dried before it is supplied to the extruder.

According to the present invention, the biaxially oriented polyester film of the present invention can be advantageously produced from the substantially amorphous unstretched film thus produced, in accordance with the following process.

That is, the substantially amorphous unstretched polyester film is (1) stretched to 4.0 to 6.0 times in a longitudinal direction, (2) stretched to 3.0 times or more and less than 4.0 times in a transverse direction, (3) further stretched to 1.01 to 1.20 times in a transverse direction while it is heat-set, and thereafter, (4) relaxed by 0 to 20% in a transverse direction while it is cooled.

The steps (1) and (2) may be carried out either simultaneously or sequentially. That is, in the steps (1) and (2), the above unstretched film is heated to a temperature which enables the film to be stretched (for example, a temperature of from Tg (glass transition temperature) of the polyester −10° C. to Tg+80° C.) and stretched biaxially. The film is preferably stretched to 4.0 to 6.0 times, more specifically 4.0 to 4.8 times, in a running direction (longitudinal direction) of the film. The film is preferably stretched in a transverse direction (width direction) to 3.0 to 4.0 times at a temperature equal to or higher than the longitudinal stretching temperature. The area stretch ratio is preferably 12 to 24 times. The biaxially oriented film can be produced by so-called longitudinal-transverse sequential stretching in which the unstretched film is stretched in a longitudinal direction and then in a transverse direction, or longitudinal multi-stage stretching in which the unstretched film is stretched in a longitudinal direction a plurality of times and once in a transverse direction. This biaxially oriented film may be further stretched uniaxially, i, e., in a longitudinal direction or transverse direction, or biaxially, i, e., in both longitudinal and transverse directions, to produce a biaxially re-oriented film.

Then, in the step (3). the film is finely stretched by 1 to 20% in a transverse direction in a heat-setting zone of a stenter after biaxial stretching, and in the subsequent step (4), the film is relaxed by 0 to 20% in a transverse direction in a cooling zone. The above fine stretching is more preferably carried out in a range of 1 to 10% in consideration of the slack and longitudinal heat shrinkage factor of the film and standards for the longitudinal strength as a tensilyzed film. The above relaxation is more preferably carried out in a range of 0.1 to 10%. The fine stretching of the step (3) is carried out at a temperature higher than the final stretching temperature, preferably higher than the temperature by at least 10° C. but lower than the melting point (Tm) of the polyester, more preferably lower than (Tm −30)° C.

Since the heat shrinkage factor in a transverse direction becomes high when the above fine stretching (toe-out) is carried out, it is necessary to control the heat shrinkage factor by carrying out the relaxation (toe-in) in a cooling zone in the step (4), as described above. Slight toe-in may be carried out in the latter half of the heat-setting zone after carrying out toe-out. Although slight return of bowing can be seen by the toe-in, the effect of fine stretching remains fully. When the amount of toe-in is more than 20%, many wrinkles are produced in the film at the outlet of the stenter, causing creases disadvantageously. These conditions have almost no influence on thickness nonuniformity, and the difference in thickness uniformity between longitudinal and transverse directions can be reduced to 8% or less. In this connection, for the propose of reducing this heat shrinkage factor, it is conceivable to increase the heat-setting temperature instead of fine stretching. When the heat-setting temperature is too high, however, the heat shrinkage factor in the stenter becomes large and bowing also becomes marked, which are disadvantageous. The surface of the thus obtained biaxially oriented film may be subjected to a surface activation treatment (such as a plasma treatment, amine treatment or corona treatment) as disclosed by JP-B 56-18381 and JP-B 57-30854.

The biaxially oriented polyester film of the present invention is advantageously produced as a longitudinally long film having a width of 3 to 10 m. The film preferably shows a difference in a transverse (width.) direction of heat shrinkage factor at 105° C. in a longitudinal direction of 0.05 to 0.2% per 1 m in a transverse (width) direction in an about 1 m wide area from the edge (i, e., edge parallel to a lengthwise direction) of the film.

The biaxially oriented polyester film of the present invention preferably has a thickness of 0.5 to 20 μm, though it varies according to application purpose. This polyester film is useful in such application fields where it is preferred to have as small surface defects as possible as capacitor films (for example, films of 3 μm or less in thickness), printer ribbon films (for example, films of about 5 μm in thickness), films for heat sensitive mimeograph, base films for magnetic recording media, especially QIC, and the like. According to the knowledge of the present inventors, it is important for magnetic recording media to have small heat shrinkage characteristics (TMA) under a constant load and uniform extension and contraction characteristics in a transverse direction under heating. The biaxially oriented polyester film of the present invention satisfies the above requirements, can prevent troubles in the step of heating a film in the production process, occurrence of curving of running of the film in the drying step after magnetic coating or the like and hence, is useful as a base film for magnetic recording media, especially for QIC.

EXAMPLES

The following examples are given to illustrate the present invention in further detail. The values of characteristic properties were obtained in accordance with the measurement of the following methods.

1. F-5 Value

Five 10 mm wide (short side), 100 mm long (long side) film pieces are cut out from a biaxially oriented polyester film with the long side in its longitudinal direction. These film pieces are pulled with the tensile tester of Toyo Seiki Co., Ltd. at a pulling speed of 100 mm/min to measure a stress at the time of 5% distortion 5 times (n=5) and the mean value of measurement data is taken as an F-5 value.

2. Heat Shrinkage Factor (1) Heat Shrinkage Factor at 105° C. in Longitudinal Direction A 10 mm wide (short side), 300 mm or more long (long side) test piece is cut out in a longitudinal direction of a biaxially oriented polyester film from one point (to be referred to as "point A" hereinafter) of an end portion of the biaxially oriented polyester film along an edge. Marks are put on the test piece at intervals of 300 mm in a longitudinal direction, and the test piece is placed in a hot air circulating oven at 105° C. in a free state, taken out after 30 minutes and left for 10 minutes to be cooled. The interval between the marks of this test piece is measured 5 times (n=5) and the mean of values obtained from [(interval between marks before heat treatment—interval between marks after heat treatment) X 100/interval between marks before heat treatment] is taken as a heat shrinkage factor at 105° C. in a longitudinal direction.

(2) Difference in Transverse Direction of Heat Shrinkage Factor at 105° C. in Longitudinal Direction (difference of heat shrinkage factor)

When a point 100 cm away from the point A of (1) above in a transverse direction is called point B and the heat shrinkage factors of the test piece from the points A and B as starting points are represented by "aw" and "b", respectively, the difference of heat shrinkage factor is expressed by:

|a−b|/distance between points A and B (%/m)

When the width of the film is small and the point B is not existent on the film, a point of the other end of the film is used as the point B.

(3) Heat Shrinkage Factors at 105° C. in Transverse Direction

The measurement is made in the same manner as (1) above except that a 10 mm wide (short side), 300 mm or more long (long side) test piece is cut out toward the width direction from an end portion of a biaxially oriented polyester film and marks are put on the test piece at intervals of 300 mm in a longitudinal direction.

3. Thickness Nonuniformity (thickness nonuniformity in longitudinal direction)

A 2 m test piece is cut out in a longitudinal (lengthwise) direction from a biaxially oriented polyester film, the thickness of the test piece is measured with the electron-micrometer of Anritsu Co., Ltd. and a percentage obtained by dividing the difference between the maximum thickness and the minimum thickness by an average thickness is taken as a thickness nonuniformity in a longitudinal direction.

(thickness nonuniformity in transverse direction)

A 60 cm test piece is cut out in a width (transverse) direction from a biaxially oriented polyester film and measured for the thickness nonuniformity in a transverse direction in the same manner as in the measurement of thickness nonuniformity in a longitudinal direction.

4. slack

A 1 m wide, 5 m long test piece is cut out from a biaxially oriented polyester film, this sample film is spread on a plane and marked with a line perpendicular to a longitudinal direction at a location of 5 m. Thereafter, the film is slit to a width of 50 mm in a longitudinal direction, and the length of each slit film is measured to obtain the a degree of change in length as slack.

5. Difference in Transverse Direction of Elongation in Longitudinal Direction (difference of elongation)

10 mm long (long side), 5 mm wide (short side) test pieces are cut out in a longitudinal direction from one point (to be referred to as "point C" hereinafter), of an endportion of a biaxially oriented polyester film along the end portion of the film, and a tension of 1,000 g/mm$^2$ is applied to the test pieces in a longitudinal direction with the TM-3000 of Shinkuu Riko Co., Ltd. to measure the extension and contraction characteristics in a longitudinal direction of the test pieces by elevating temperature at a rate of 10° C./min in a nitrogen atmosphere. Elongation in a longitudinal direction is obtained by dividing the amount of elongation at a temperature of 100° C. by the length (long side) of a sample.

A point 100 cm away from the above point C in a transverse direction is called point D and the elongation in a longitudinal direction of the point D is obtained in the same manner as above. When the elongations in longitudinal direction of the test piece from the points C and D as starting points are represented by "c" and "d", respectively, the difference in a transverse direction of elongation in a longitudinal direction is expressed by:

|c−d| /distance between points C and D (%/m)

When the width of the film is small and the point D is not existent on the film, a point of the other end of the film is used as the point D.

6. Breaking

In the production of biaxially oriented polyester films of Examples and Comparative Examples, the breaking of a film is evaluated based on the following criteria.

○: The film Is not broken for 10 hours

Δ: The film is broken once for 10 hours

X: The film is broken twice or more for 10 hours

7. Curving in Oven

A 1,000 mm wide film is passed through a 30 m long air floating oven at a temperature of 100° C. and a tension of 10 kg/m and is evaluated based on the following criteria.

O: The positional displacement in a transverse direction of the edge of the film at the outlet of the oven with respect to the inlet is 18 mm or less.

X: The positional displacement in a transverse direction of the edge of the film at the outlet of the oven with respect to the inlet is larger than 18 mm

Example 1

The pellets of polyethylene terephthalate (Tm=256° C., Tg=68° C.) having an intrinsic viscosity of 0.60 and containing 0.05 wt % of silica particles having an average particle diameter of 0.6 μm based on the polyester were used. The pellets were dried at 170° C. for 3 hours, supplied to an extruder, melt-extruded at 280° C. and cooled on a metal roll at 30° C. to give an unstretched film.

Then, the unstretched film was heated to 80° C. with an infrared (IR) heater, stretched to 4.5 times in a longitudinal (lengthwise) direction (IR stretching) and cooled to 20° C. immediately. Subsequently, the film was stretched to 3.7 times in a transverse direction at 90° C. using the transverse-direction stretching device of a stenter, finely stretched by 5% in a transverse direction (heat-setting zone toe-out) while it was heat-set at 220° C., by 2% at 180° C. in the latter stage of the heat-setting zone (heat-setting zone toe-in) and by 2% at 110° C. in a cooling zone (cooling zone toe-in), and then taken up.

The obtained biaxially oriented polyethylene terephthalate film had an F-5 value of 14.5 kg/mm$^2$, a heat shrinkage factor at 105° C. in a longitudinal direction of 1.2% , a heat shrinkage factor in a transverse direction of nearly 0%, a difference in a transverse direction of heat shrinkage factor at 105° C. in a longitudinal direction of 0.1%/m and a difference in a transverse direction of elongation at 100° C. in a longitudinal direction of 0.05%/m. Thus, the biaxially oriented polyethylene terephthalate film was satisfactory in terms of all these characteristic properties.

When this biaxially oriented polyethylene terephthalate film was used in a long-playing magnetic recording tape, the running of the film in a drying oven in the tape production process was well carried out without occurrence of curving.

Examples 2 to 4

When films were produced under the same conditions as those of Example I except for those shown in Table 1, good results were obtained. The results are shown in Table 1.

Examples 5 and 6

After unstretched films were obtained in the same manner as in Example 1, they were subjected to a multi-stage stretching, that is, they were stretched to 2.0 times with a roll heated at 110° C. as the first-stage stretching and then IR stretched at a film temperature of 100° C. in a longitudinal direction as the second-stage stretching. When biaxially oriented films were produced under the same conditions as in Example 1 except for those shown in Table 1 after stretching in a longitudinal direction, good results were obtained as shown in Table 1.

Example 7

An unstretched film was obtained in the same manner as in Example 1, and subjected to a multi-stage stretching, that is, it is stretched to 2.5 times with a roll heated at 110° C. as the first-stage stretching and then IR stretched to 1.82 times at a film temperature of 80° C. in a longitudinal direction as the second-stage stretching. When a biaxially oriented film was produced under the same conditions as in Example 1 except those shown in Table 1 after stretching in a longitudinal direction, good results were obtained as shown in Table 1

Comparative Example 1

As shown in Table 2, when the same conditions as in Example 1 were employed except that the stretch ratio in a longitudinal direction was changed to 4.5 times and the toe-out was changed to 0%. the obtained biaxially oriented film had a large difference in a transverse direction of heat shrinkage factor at 105° C. in a longitudinal direction of 0.4%/m, and the running of the film in a drying oven in the tape production process was curved. Thus, good results were not obtained. The results are shown in Table 2.

Comparative Examples 2 and 3

When biaxially oriented films were produced under the same conditions as in Example 1 except for those shown in Table 2, the obtained results were not satisfactory as shown in Table 2. The results are shown in Table 2.

Comparative Example 4

When a biaxially oriented film was produced under the same conditions as in Example 5 except for those shown in Table 2, the obtained results were not satisfactory as shown in Table 2. The results are shown in Table 2.

TABLE 1

|  |  |  | Ex. 1 | Ex. 2 | Ex. 3 | Ex. 4 |
|---|---|---|---|---|---|---|
| stretching conditions | longitudinal stretch ratio | times | 4.5 | 4 | 4.5 | 4 |
|  | longitudinal stretching system |  | single-stage IR stretching | single-stage IR stretching | single-stage IR stretching | single-stage IR stretching |
|  | heat-setting zone toe-out | % | 5 | 5 | 1 | 20 |
|  | total transverse stretch ratio | times | 3.7 | 3.7 | 3.7 | 3.7 |
|  | heat-setting zone toe-in | % | 2 | 2 | 2 | 2 |
|  | cooling zone toe-in | % | 2 | 2 | 0 | 15 |
| physical properties | F-5 value | kg/mm² | 14.5 | 13 | 14.5 | 13.5 |
|  | difference of heat shrinkage factor *1 | %/m | 0.1 | 0.05 | 0.2 | 0.05 |
|  | difference of elongation *2 | %/m | 0.05 | 0.03 | 0.1 | 0.03 |
|  | thickness nonuniformity in longitudinal direction | % | 3.5 | 3.8 | 3.5 | 3.8 |
|  | thickness uniformity in transverse direction | % | 4.0 | 3.5 | 4.0 | 3.5 |
| condition of film formation | slack | % | 0.08 | 0.08 | 0.02 | 0.35 |
|  | breaking |  | ○ | ○ | ○ | ○ |
| characteristic property | curvature in oven |  | ○ | ○ | ○ | ○ |

|  |  |  | Ex. 5 | Ex. 6 | Ex. 7 |
|---|---|---|---|---|---|
| stretching conditions | longitudinal stretch ratio | times | 2.0 × 2.5 | 2.0 × 2.5 | 2.0 × 1.82 |
|  | longitudinal stretching system |  | multi-stage longitudinal stretching | multi-stage longitudinal stretching | multi-stage longitudinal stretching |
|  | heat-setting zone toe-out | % | 1 | 20 | 5 |
|  | total transverse stretch ratio | times | 3.7 | 3.7 | 3.7 |
|  | heat-setting zone toe-in | % | 2 | 2 | 2 |
|  | cooling zone toe-in | % | 0 | 15 | 2 |
| physical properties | F-5 value | kg/m² | 18 | 18 | 15 |
|  | difference of heat shrinkage factor *1 | %/m | 0.2 | 0.05 | 0.15 |
|  | difference of elongation *2 | %/m | 0.1 | 0.03 | 0.05 |
|  | thickness nonuniformity in longitudinal direction | % | 3.0 | 3.0 | 3.2 |
|  | thickness uniformity in transverse direction | % | 3.5 | 3.5 | 2.5 |
| condition of film formation | slack | % | 0.02 | 0.35 | 0.08 |
|  | breaking |  | ○ | ○ | ○ |
| characteristic property | curvature in oven |  | ○ | ○ |  |

*1: difference in transverse direction of heat shrinkage factor at 105° C. in longitudinal direction
*2: difference in transverse direction of elongation in longitudinal direction

TABLE 2

|  |  |  | C. Ex. 1 | C. Ex. 2 | C. Ex. 3 | C. Ex. 4 |
|---|---|---|---|---|---|---|
| stretching conditions | longitudinal stretch ratio | times | 4.7 | 3.8 | 4.5 | 2.0 × 3.5 |
|  | longitudinal stretching system |  | single-stage IR stretching | single-stage IR stretching | single-stage IR stretching | multi-stage longitudinal stretching |
|  | heat-setting zone toe-out | % | 0 | 5 | 22 | 5 |
|  | total transverse stretch ratio | times | 3.7 | 3.7 | 3.7 | 3.7 |

TABLE 2-continued

|  |  |  | C. Ex. 1 | C. Ex. 2 | C. Ex. 3 | C. Ex. 4 |
|---|---|---|---|---|---|---|
|  | heat-setting zone toe-in | % | 2 | 2 | 2 | 2 |
|  | cooling zone toe-in | % | 0 | 2 | 18 | 2 |
| physical | F-5 value | kg/mm² | 15 | 12.5 | 14.5 | 20 |
| properties | difference of heat shrinkage factor *1 | %/m | 0.4 | 0.3 | 0.03 | 0.15 |
|  | difference of elongation *2 | %/m | 0.3 | 0.3 | 0.03 | 0.15 |
|  | thickness nonuniformity in longitudinal direction | % | 3.5 | 3.8 | 3.5 | 3.5 |
|  | thickness uniformity in transverse direction | % | 4.5 | 3.2 | 4.0 | 10.0 |
| condition of film formation | slack | % | −0.05 | 0.08 | 0.45 | 0.08 |
|  | breaking |  | ◯ | ◯ | ◯ | X |
| characteristic property | curvature in oven |  | X | ◯ | ◯ | ◯ |

*1: difference in transverse direction of heat shrinkage factor at 105° C. in longitudinal direction
*2: difference in transverse direction of elongation in longitudinal direction

Example 8

The pellets of polyethylene terephthalate (Tm=256° C., Tg=68° C.) having an intrinsic viscosity of 0.60 and containing 0.05 wt % of silica particles having an average particle diameter of 0.6 μm based on the polyester were used. The pellets were dried at 170° C. for 3 hours, supplied to an extruder, melt-extruded at 280° C. and cooled on a metal roll at 30° C. to give an unstretched film.

Then, the unstretched film was stretched, as the first-stage stretching, to 2.5 times at 110° C., heated at 90° C. with an infrared (IR) heater, stretched to 1.82 times in a longitudinal (lengthwise) direction with a total stretch ratio of 4.55 times and cooled to 20° C. immediately.

Subsequently, the film was stretched to 3.6 times in a transverse direction at 99° C. using the transverse-direction stretching device of a stenter, finely stretched by 7 t in a transverse direction (heat-setting zone toe-out) while it was heat-set at 220° C. by 2% at 180° C. in the latter stage of the heat-setting zone (heat-setting zone toe-in) and by 2% at 110° C. in a cooling zone (cooling zone toe-in), and then taken up.

The obtained biaxially oriented polyethylene terephthalate film had an F-5 value of 14.5 kg/mm², a heat shrinkage factor at 105° C. in a longitudinal direction of 1.2%, a heat shrinkage factor in a transverse direction of nearly 0%, a difference in a transverse direction of heat shrinkage factor at 105° C. in a longitudinal direction of 0.1%/m and a difference in a transverse direction of elongation at 100° C. in a longitudinal direction of 0.05%/m. Thus, the biaxially oriented polyethylene terephthalate film was satisfactory in terms of all these characteristic properties. The thickness nonuniformity in a transverse direction of the film was a satisfactory value of 4%.

When this biaxially oriented polyethylene terephthalate film was used in a long-playing magnetic recording tape, the running of the film in a drying oven in the tape production process was not curved.

Examples 9 to 12

When biaxially oriented films were produced under the same conditions as in Example 8 except for those shown in Table 3, good results were obtained. The results are shown in Table 3.

Comparative Example 5

As shown in Table 4, a biaxially oriented film was produced under the same conditions as in Example 8 except that the stretch ratio in a longitudinal direction was changed to 4.9 times, the stretch ratio in a transverse direction was changed to 3.9 times and the toe-out was changed to 7%. The maximum difference in a transverse direction of heat shrinkage factor in a longitudinal direction was as large as 0.4% and the running of the film in a drying oven in the tape production process was curved. Thus, good results were not obtained. The results are shown in Table 4.

Comparative Examples 6 and 7

When biaxially oriented films were produced under the same conditions as in Example 8 except for those shown in Table 4, the obtained results were not satisfactory. The results are shown in Table 4.

TABLE 3

|  |  |  | Ex. 8 | Ex. 9 | Ex. 10 | Ex. 11 | Ex. 12 |
|---|---|---|---|---|---|---|---|
| stretching conditions | first-stage longitudinal stretch ratio | times | 2.5 | 2.5 | 2.5 | 2.5 | 2.5 |
|  | first-stage longitudinal stretching temperature | ° C. | 110 | 110 | 110 | 110 | 110 |
|  | second-stage longitudinal stretch ratio | times | 1.82 | 1.82 | 1.88 | 1.92 | 1.82 |
|  | second-stage longitudinal stretching temperature | ° C. | 90 | 90 | 90 | 90 | 90 |
|  | total longitudinal stretch ratio | times | 4.55 | 4.55 | 4.7 | 4.8 | 4.55 |
|  | heat-setting zone toe-out | % | 7 | 7 | 7 | 7 | 2 |
|  | total transverse stretch ratio | times | 3.6 | 3.8 | 3.8 | 3.9 | 3.6 |
|  | heat-setting zone toe-in | % | 2 | 2 | 2 | 2 | 2 |
|  | cooling zone toe-in | % | 2 | 2 | 2 | 2 | 2 |

TABLE 3-continued

|  |  |  | Ex. 8 | Ex. 9 | Ex. 10 | Ex. 11 | Ex. 12 |
|---|---|---|---|---|---|---|---|
| physical properties | F-5 value | kg/mm² | 14.5 | 14 | 14.5 | 14.5 | 14.5 |
|  | difference of heat shrinkage factor *1 | %/m | 0.1 | 0.14 | 0.18 | 0.2 | 0.2 |
|  | difference of elongation *2 | %/m | 0.05 | 0.07 | 0.09 | 0.1 | 0.1 |
|  | thickness nonuniformity in longitudinal direction | % | 3.0 | 3.5 | 3.0 | 3.0 | 3.0 |
|  | thickness nonuniformity in transverse direction | % | 4 | 3.5 | 4 | 3 | 4 |
| characteristic property | curving in oven |  | ○ | ○ | ○ | ○ |  |

*1: difference in transverse direction of heat shrinkage factor at 105° C. in longitudinal direction
*2: difference in transverse direction of elongation in longitudinal direction

TABLE 4

|  |  |  | C. Ex. 5 | C. Ex. 6 | C. Ex. 7 |
|---|---|---|---|---|---|
| stretching conditions | first-stage longitudinal stretch ratio | times | 2.5 | 2.5 | 2.5 |
|  | first-stage longitudinal stretching temperature | ° C. | 110 | 110 | 110 |
|  | second-stage longitudinal stretch ratio | times | 1.96 | 1.82 | 1.82 |
|  | second-stage longitudinal stretching | ° C. | 90 | 90 | 90 |
|  | total longitudinal stretch ratio | times | 4.9 | 4.55 | 4.55 |
|  | heat-setting zone toe-out | % | 7 | 7 | 0 |
|  | total transverse stretch ratio | times | 3.6 | 4.2 | 3.6 |
|  | heat-setting zone toe-in | % | 2 | 2 | 2 |
|  | cooling zone toe-in | % | .2 | 2 | 2 |
| physical properties | F-5 value | kg/mm² | 17 | 12.5 | 14.5 |
|  | difference of heat shrinkage factor *1 | %/m | 0.3 | 0.3 | 0.4 |
|  | difference of elongation *2 | %/m | 0.25 | 0.25 | 0.35 |
|  | thickness nonuniformity in longitudinal direction | % | 2.8 | 4.0 | 3.0 |
|  | thickness nonuniformity in transverse direction | % | 5 | 2.5 | 5 |
| characteristic property | curving in oven |  | X | X | X |

*1: difference in transverse direction of heat shrinkage factor at 105° C. in longitudinal direction
*2: difference in transverse direction of elongation in longitudinal direction

What is claimed is:

1. A biaxially oriented polyester film having (a) an F-5 value in a longitudinal direction of 13 kg/mm² or more, (b) a thickness nonuniformity in each of both longitudinal and transverse directions of 8% or less, and (c) a difference in the heat shrinkage factor of 0.02 to 0.2% per 1 m in the transverse direction, said heat shrinkage factor being measured at 105° C. in the longitudinal direction.

2. The biaxially oriented polyester film of claim 1, wherein the F-5 value in a longitudinal direction is from 13 to 18 kg/mm².

3. The biaxially oriented polyester film of claim 1, wherein the thickness nonuniformity in each of both longitudinal and transverse directions satisfies the following expression when the thickness of the film is 3 to 14 μm:

$$-0.2t+3.5 \leq d \leq -0.4t+9.2$$

wherein t is the thickness (μm) of the film and d is a thickness nonuniformity (%), and is 0.7 to 3.6% when the thickness of the film is larger than 14 μm.

4. The biaxially oriented polyester film of claim 1, wherein the difference in the elongation is 0.01 to 0.1% per 1 m in the transverse direction, said elongation being measured at 100° C. under a load of 1000 g/mm² in the longitudinal direction.

5. The biaxially oriented polyester film of claim 1, wherein the polyester is polyethylene terephthalate.

6. A process for producing a biaxially oriented polyester film comprising the steps of:

stretching an amorphous unstretched polyester film to 4.0 to 6.0 times in a longitudinal direction;

stretching the so-obtained film to 3.0 times or more and less than 4.0 times in a transverse direction;

stretching the so-obtained film to 1.01 to 1.20 times in a transverse direction while heat-setting it; and relaxing the so-obtained film by 0 to 20% in a transverse direction while cooling it, wherein the biaxially oriented polyester film has a width of 3 to 10 m, and the difference in the heat shrinkage factor is 0.05 to 0.2% per 1 m in the transverse direction, said heat shrinkage factor being measured at 105° C. in the longitudinal direction.

7. The process of claim 6, wherein stretching in a longitudinal direction is carried out in two or more stages.

8. The process of claim 6, wherein the stretch ratio in a longitudinal direction is 4.0 to 4.8 times.

* * * * *